United States Patent [19]

Mitchell

[11] 3,801,935

[45] Apr. 2, 1974

[54] ACOUSTIC SURFACE WAVE DEVICES

[75] Inventor: Richard Frank Mitchell, Salfords, near Redhill, England

[73] Assignee: U.S. Philips Corporation, New York, N.Y.

[22] Filed: July 12, 1972

[21] Appl. No.: 271,164

[30] Foreign Application Priority Data

July 21, 1971 Great Britain .................... 34170/71

[52] U.S. Cl. .................................... 333/72, 310/9.8

[51] Int. Cl. ............................................ H03h 7/10

[58] Field of Search ............... 333/30 R, 72; 310/9.8

[56] References Cited

UNITED STATES PATENTS 3,600,710 8/1971 Adler et al. ........................... 333/72

3,675,054 7/1972 Jones et al. ........................ 333/72 X

*Primary Examiner*—Paul L. Gensler

*Attorney, Agent, or Firm*—Frank R. Trifari

[57] ABSTRACT

An acoustic surface wave device is provided with an interdigital transducer divided into a plurality of sections, the sections being connected in series. The transducer thus presents a higher and therefore more convenient terminal impedance. A filter embodiment is also shown in which two end sections of a transducer array are connected in series, thus reducing the source strengths of the electrodes without the disadvantage of either making the electrodes too narrow with consequent production errors, or with too short an overlap giving rise to errors due to end effects.

1 Claim, 2 Drawing Figures

PATENTED APR 2 1974

3,801,935

SHEET 1 OF 2

ACOUSTIC SURFACE WAVE DEVICES

Figure 1:
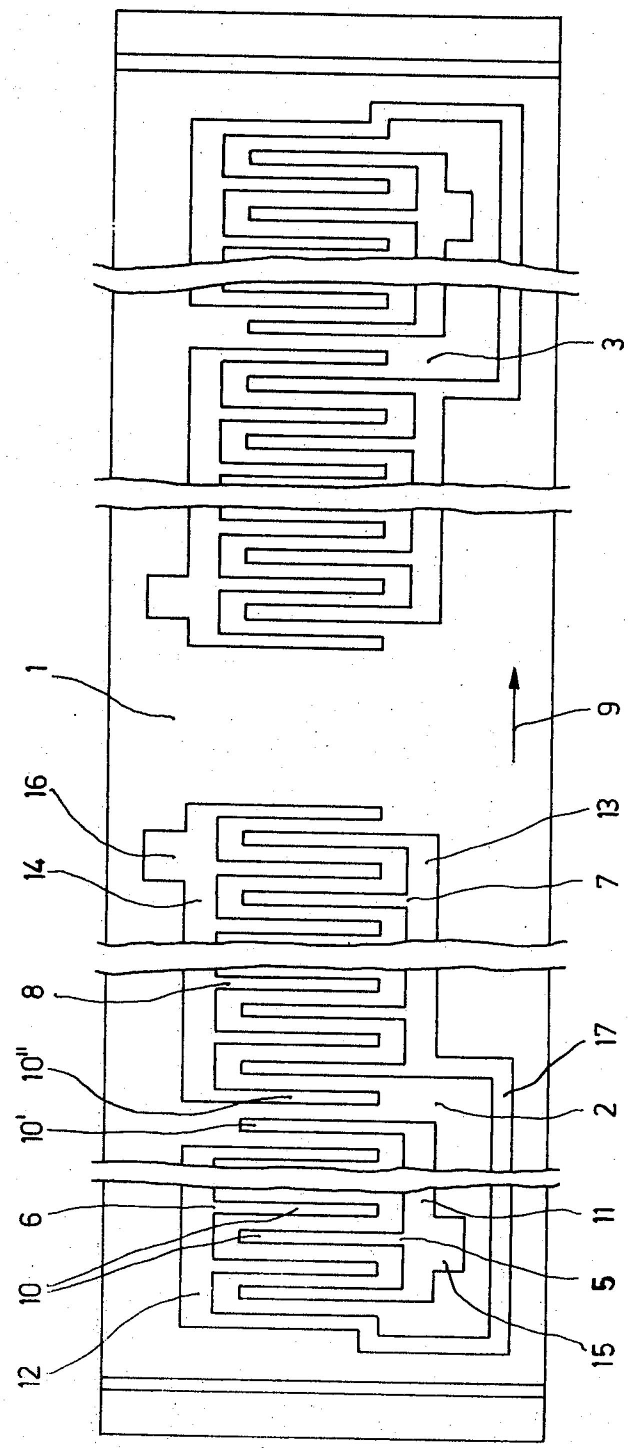

The invention relates to a surface wave filter including a body of piezoelectric material having at least a launching transducer and a receiving transducer arranged on an acoustic surface wave propagation surface of said body.

The use of acoustic surface waves has enabled devices such as delay lines or filters, to be manufactured which are small, robust and are moreover compatible with integrated circuit manufacturing techniques. Such devices also enable difficulties, such as the bulk and the manufacturing cost associated with the provision of inductors, to be avoided.

A surface wave filter is commonly formed by a thin wafer of piezoelectric material on one surface of which a launching and a receiving transducer are arranged respectively to launch and to receive an acoustic surface wave propagating over the surface. Each transducer normally comprises an interdigital array of parallel strip electrode pairs, the arrays being formed, for example by a photolithographic process, from a layer of a suitable metal, such as gold, deposited on the surface of the wafer.

In practice this kind of transducer can have an inconveniently large capacitance with piezoelectric materials of large dielectric constant, requiring special matching between the surface wave filter and a preceding and/or following amplifier. If the surface wave filter is employed as a frequency-selective network, the amplitude-frequency and phase-frequency responses thereof are determined by the number, spacing and dimensional configuration of the electrodes making up the launching and the receiving transducer. Each pair of adjacently located strip electrodes which are fed with a signal of opposite polarity, can be regarded as a discrete source of acoustic surface waves. However, for convenience of computation, a mathematical model of the array is considered in which each strip electrode is regarded as representing an individual acoustic surface wave source and the results obtained from this model are found to be satisfactory in practice for design purposes. By employing techniques of Fourier synthesis and computer optimisation which are mathematically analogous to diffraction theory, on this mathematical model, a suitable relative distribution of magnitude and spacing of such sources in the launching and receiving transducer arrays can be determined which can provide a good approximation to a desired bandpass response.

Such a design technique frequently makes it necessary to provide within either or both transducer arrays, one or more sources whose magnitude is small compared with the largest source magnitude. Normally the strength of each discrete source of acoustic surface waves is determined by such parameters as the width of the corresponding parallel strip electrode and the length in a direction perpendicular to the acoustic surface wave propagation direction of the overlap of adjacent strip electrodes in the propagation direction. The provision of relatively small sources in a transducer array of this kind thus requires either that the overlay length should be small, causing problems from diffraction and end effects, or that the electrodes should be made very narrow leading to difficulties in maintaining dimensional accuracy during manufacture.

It is an object of the invention to provide a surface wave filter in which one or more of the aforementioned difficulties are reduced or overcome.

For this purpose the device according to the invention is characterized in that at least one of the transducers comprises at least a first and a second array, each array being formed by a pair of interdigital electrodes, said arrays being arranged side by side in the direction of propagation of the acoustic surface waves and being connected electrically in series with one another across a pair of terminal connections.

Since the two arrays are connected in series between the two terminal connections the overall capacitive load present between these two terminal connections is smaller than the capacitance provided by each of these arrays. If, for example, the two arrays are identical, the overall capacitance will be only one half of the capacitance provided by each array and hence only one quarter of the capacitance which would be provided by a transducer built in the usual manner and having a number of electrodes equal to the sum of the numbers of electrodes of the two arrays. Owing to the step according to the invention the capacitive load between the two terminal connections is considerably reduced.

In a preferred embodiment the transducer comprises a third array which is arranged beside the first two arrays in the direction of propagation of the surface waves and which is formed by a pair of interdigital electrodes which are connected to the two terminal connections. This provides the advantage that a large ratio between the highest and the lowest source strengths of the electrodes is obtainable without the need for an extremely large variation of the length of overlap or of the width, for in the said preferred embodiment the source strength of the electrodes of the first and second arrays automatically is smaller than that of the third array, because owing to the series connection the voltage between the electrodes of these first two arrays is smaller than the voltage between the electrodes of the third configuration. By causing, in a further preferred embodiment, the first and second arrays to realize a comparatively weak response component of the overall response this response component may be very small without giving rise to extremely small length of overlap or width of the electrodes. Preferably the first and second arrays are arranged one on either side of the third array, which enables the symmetry of the transducer to be maintained.

Figure 2:
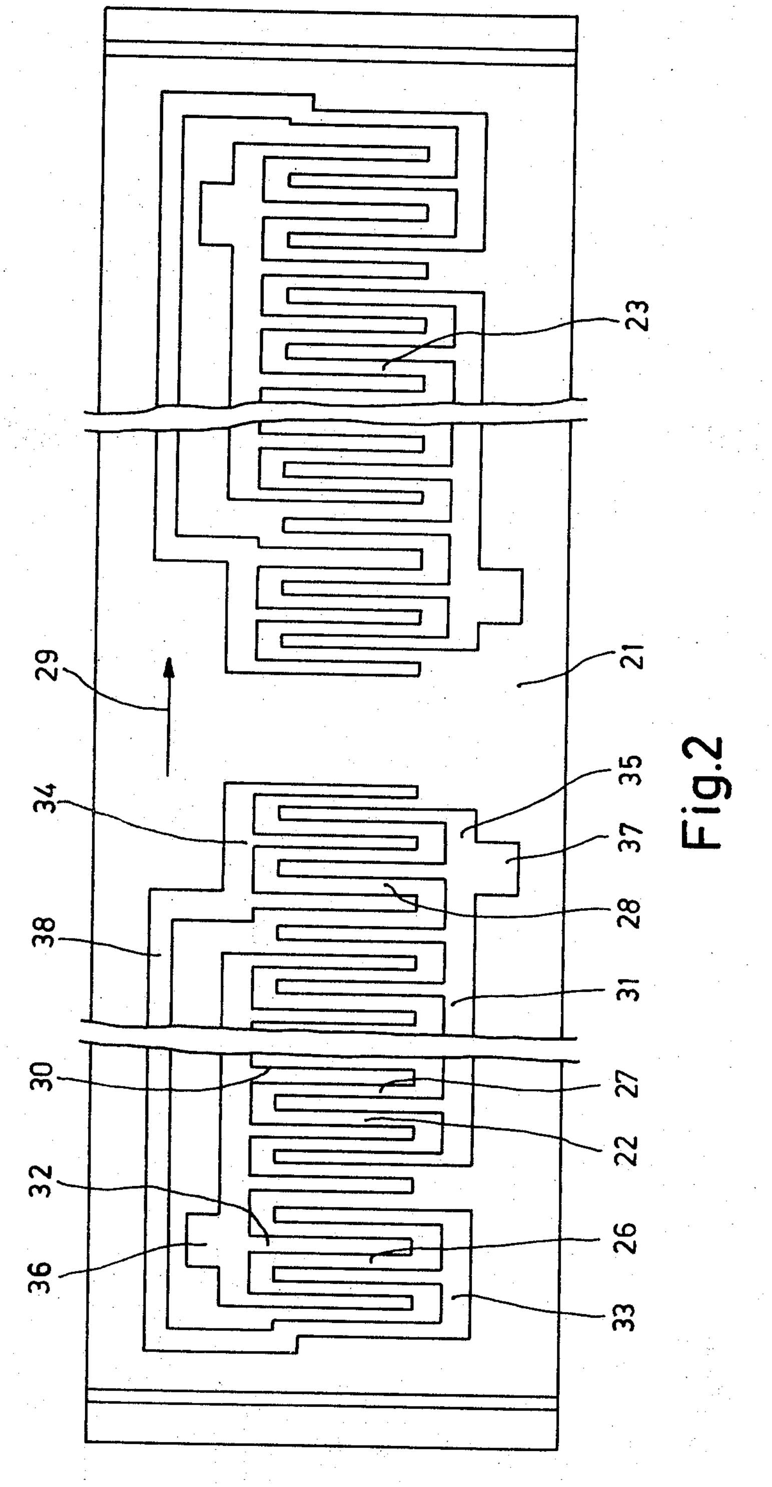

In order that the invention may be clearly understood and readily carried into effect embodiments thereof will now be described by way of example, with reference to the accompanying drawings of which:

FIG. 1 shows a low capacitance acoustic surface wave transducer embodying the invention, and FIG. 2 shows an embodiment in which the weak sources of a transducer are formed by component arrays connected in series.

Referring to FIG. 1 which shows, in plan view, an acoustic surface wave filter, a body 1 in the form of a wafer of piezoelectric material, suitably a piezoceramic, has applied to the upper surface thereof an acoustic surface wave launching transducer 2 and a corresponding receiving transducer 3. According to the invention the transducers 2, 3 comprise arrays of interdigital electrode pairs formed on the surface of the body 1, suitably by photolithography from a vapor deposited layer of gold.

The launching transducer 1 comprises two pairs of interdigital electrodes 5, 6 and 7, 8 arranged in order of succession along the propagation direction 9 for acoustic surface waves propagating towards the receiving transducer 3. Each of the electrodes 5, 6, 7, 8 comprise a plurality of parallel strip electrodes 10 connected to a respective common connection 11, 12, 13, 14. The electrodes 5 and 8 are connected to terminal feed connections 15, 16 and the common connections 12, and 13 of the electrodes 6 and 7 are connected together via a connecting link 17. In this way the two pairs of electrodes 5, 6 and 7, 8 are connected in series across a high frequency supply source connected to ther terminals 15, 16 and the capacitance load presented to the source is approximately one quarter of the capacitance of a conventional array having a similar number of electrodes. In this way a transducer array having a large number of strip electrodes 10 can be produced having a loading capacitance which is within the capabilities of normal amplifiers.

The receiving transducer array 3 can be formed as shown in a manner similar to that of the launching transducer 2. By employing the series connection described, the receiving transducer 3 will present a lower capacitance to the input circuit of an amplifier connected thereto than would a conventional receiving transducer of similar size, thus allowing a relatively large and therefore selective transducer to be connected to a conventional amplifier.

The division of each transducer into two series connected pairs of electrodes is facilitated by the longitudinal symmetry of a normal transducer about the center. However, the capacitance of each transducer can be further reduced by division into a greater number of electrode pairs all of which are connected in series. In this case care must be taken in design to make the impedance of each electrode pair of suitable value, preferably equal to each other, over the working frequency band.

It should be noted that, in the embodiment shown in FIG. 1, the electrode elements 10′ and 10″ which are components of the electrodes 5 and 8 connected to the supply terminals 15 and 16 are situated side by side in the array and subjected to twice the voltage difference experienced by other pairs of adjacent electrode elements 10. In order that the equivalent acoustic surface wave component generated by the electrodes 10′ and 10″ should conform to the desired magnitude, it will be realized that appropriate adjustments in electrode size or overlap must be carried out in accordance with normal design technique.

A further embodiment, illustrated in FIG. 2 to which reference will now be made, comprises an acoustic surface wave filter in which the transducers are formed on the upper surface of a wafer 21 of piezoelectric material, suitably a piezoceramic. An acoustic surface wave launched by a launching transducer 22, propagates over the surface of the wafer in the direction 29 as a substantially parallel beam and is picked up by a receiving transducer 23. The launching transducer 22 comprises three pairs of interdigital electrodes 26, 27 and 28 arranged in order of succession along the acoustic surface wave propagation direction 29. The electrode pair 27 comprise electrodes 30, 31 connected respectively to terminal connections 36, 37. The electrodes 30, 31 are formed with parallel strip electrodes alternately connected to the respective electrode 30 and 31 and arranged transverse to the acoustic surface wave propagation direction 29.

The electrode pairs 26 and 28 comprise in similar manner electrodes 32, 33 and 34, 35 each formed with parallel strip electrodes arranged as hereinbefore described. The electrode pairs 26 and 28 are, however, connected in series across the electrode pair 27, the electrodes 32 and 35 being connected respectively to the terminals 36 and 37, and the electrodes 33 and 34 connected together via the connection 38. Thus only half the signal voltage applied across the electrode pair 27 is fed to each of the electrode pairs 26 and 28.

The launching transducer 22 is designed to provide, in combination with the receiving transducer 23, which latter can be of the same form as that of the transducer 22, a predetermined band-pass filter effect. This involves varying, over the length of the array, the effective strengths of equivalent acoustic surface wave sources which are assumed to correspond to the respective electrode elements of the array. In normal filter designs the equivalent sources have to be strongest near the center of the transducer and to decrease in strength, becoming relatively weak towards each end. This is commonly achieved by reducing the width of the strip electrode 10 or the length of overlap of one strip electrode 10 with an adjacent electrode. However, it is difficult to manufacture very narrow strip electrodes with accuracy, and a short overlap produces diffraction effects such as for example a wide lobed beam instead of a parallel beam. By reducing the drive voltage across each of the electrode pairs 26 and 28 by the series connection, it is now possible to provide relatively weak equivalent sources at or near the ends of the transducer 22 without having to make the strip electrodes 10 very narrow or, alternatively, to employ an unsatisfactorily short overlap of adjacent strip electrodes 10. It will be readily apparent that further improvement can be effected, if desired, by arranging four series connected pairs of interdigital electrodes, two at each end of the transducer, or more if especially weak sources are required, however in this case also care will have to be exercised during design to ensure that the pairs of electrodes connected in series each have an appropriate, preferably mutually equal, impedance over the working frequency range.

The receiving transducer 23 can be arranged in the same way as the launching transducer 22 in which case the filter design procedure will compute both transducers. Alternatively the band-pass filter effect can be obtained by suitable design of one transducer while the other transducer is arranged to have a more uniform electrode structure.

The transducers 22 and 23 can be formed as in the embodiment described with reference to FIG. 1.

What we claim is:

1. A surface-wave filter, comprising a body of piezoelectric material, a receiving transducer on the acoustic wave propagation surface of the piezoelectric material, at least three interdigitized electrode launching transducer components sequentially arranged along the direction of acoustic wave propagation on the acoustic wave propagation surface of the piezoelectric material, a first electrical conductor connecting the two launching transducer components at the ends of the sequential arrangement in series, additional electrical conductors connecting an inner launching transducer component located between the end launching transducer components in parallel with the series connected end launching transducer components.

* * * * *